United States Patent
Palikuqi et al.

(10) Patent No.: US 10,423,529 B2
(45) Date of Patent: Sep. 24, 2019

(54) SYSTEMS AND METHODS FOR RECONSTRUCTING CACHE LOSS

(71) Applicant: MZ IP Holdings, LLC, Palo Alto, CA (US)

(72) Inventors: Ajk Palikuqi, San Jose, CA (US); Garth Gillespie, Palo Alto, CA (US); Arya Bondarian, Fountain Valley, CA (US); Jai Kim, San Mateo, CA (US)

(73) Assignee: MZ IP HOLDINGS, LLC, Palo Alto, CA (US)

( * ) Notice: Subject to any disclaimer, the term of this patent is extended or adjusted under 35 U.S.C. 154(b) by 0 days.

(21) Appl. No.: 15/946,083

(22) Filed: Apr. 5, 2018

(65) Prior Publication Data

US 2018/0225207 A1    Aug. 9, 2018

Related U.S. Application Data

(63) Continuation of application No. 15/875,139, filed on Jan. 19, 2018.

(60) Provisional application No. 62/448,619, filed on Jan. 20, 2017.

(51) Int. Cl.
| | |
|---|---|
| *G06F 12/00* | (2006.01) |
| *G06F 12/0815* | (2016.01) |
| *G06F 12/0813* | (2016.01) |
| *H04L 29/08* | (2006.01) |
| *G06F 16/957* | (2019.01) |
| *G06F 11/00* | (2006.01) |

(52) U.S. Cl.
CPC ......... *G06F 12/0815* (2013.01); *G06F 11/00* (2013.01); *G06F 12/0813* (2013.01); *G06F 16/9574* (2019.01); *H04L 67/2842* (2013.01); *H04L 67/02* (2013.01)

(58) Field of Classification Search
CPC ................ G06F 12/0815; G06F 12/0813
See application file for complete search history.

(56) References Cited

U.S. PATENT DOCUMENTS

| | | | |
|---|---|---|---|
| 2010/0235579 A1 | 9/2010 | Biles et al. | |
| 2012/0198174 A1 | 8/2012 | Nellans et al. | |
| 2014/0325115 A1* | 10/2014 | Ramsundar | G06F 12/0238 711/102 |
| 2016/0259727 A1* | 9/2016 | Liang | G06F 12/0804 |

OTHER PUBLICATIONS

Int'l Search Report and Written Opinion of the ISA/EP in PCT/US2018/014456; dated Apr. 6, 2018; 16 pgs.

* cited by examiner

*Primary Examiner* — Gurtej Bansal
(74) *Attorney, Agent, or Firm* — Goodwin Procter LLP

(57) ABSTRACT

Implementations of this disclosure are directed to systems, methods and media for assessing the status of data being stored in distributed, cached databases that includes retrieving, from a data cache, variables which include a cache loss indicator and a non-null value. The variables are analyzed to determine a state of the cache loss indicator. If the cache loss indicator indicates an intentional cache loss state, the cache loss indicator is removed and the non-null value is provided to an application. Otherwise, a cache restore process is initiated.

20 Claims, 6 Drawing Sheets

SYSTEMS AND METHODS FOR RECONSTRUCTING CACHE LOSS

CROSS-REFERENCE TO RELATED APPLICATIONS

This application is a continuation of U.S. patent application Ser. No. 15/875,139, filed Jan. 19, 2018, which claims the benefit of U.S. Provisional Patent Application Ser. No. 62/448,619, filed on Jan. 20, 2017, the entire contents of each of which are hereby incorporated by reference.

FIELD OF THE INVENTION

In general, embodiments of this disclosure relate to management of cached data in a high-transaction, high-availability environment and, in particular, to systems and methods for improving the reliability and response times in instances of data loss.

BACKGROUND

There are a wide variety of ways of storing data persistently, particularly with cloud-based systems. These include file systems, relational databases (e.g. DB2, MySQL, SQL Server), NoSQL systems, and the like.

The emergence and popularity of in-memory NoSQL databases (often interpreted as "not only SQL" where SQL refers to structured query language) can be attributed to the flexible data model and the huge performance gain they provide as compared with a traditional relational database management system (RDBMS). In particular, NoSQL databases adopt flexible, schema-less data models, which eases application usage and fits well to the need of many applications. In addition, by relaxing the stringent design properties required by traditional RDBMS, NoSQL databases can often benefit from a less sophisticated design architecture, which yields much greater performance as the database scales. As a result, open-source and proprietary NoSQL data stores, such as, for example, Memcached, Redis, Voldemort, MongoDB and Couchbase, have gained huge grounds in terms of market adoption in recent years.

SUMMARY OF THE INVENTION

In accordance with various embodiments of the disclosed subject matter, methods, systems, and media for assessing the status of data being stored in distributed, cached databases. In distributed caching systems, it is advantageous to know definitively whether a specific variable has been cleared or lost inadvertently due to a server failure or some other unforeseen event, or if the variable was manually removed or cleared intentionally. Existing methods require significant additional processing resources, or introduce unwanted instability.

Therefore, in a first aspect, the invention provides a computer implemented method for data management comprising retrieving, from a data cache, variables which include a cache loss indicator and a non-null value. A computer processor is used to analyze the variables to determine a state of the cache loss indicator. If the cache loss indicator indicates an intentional cache loss state, removing the cache loss indicator and providing the value to an application. Otherwise, initiating a cache restore process.

In certain embodiments, the variable may be a string data type, a data pairing, or an integer data type. The cache loss indicator may be appended to the beginning or the end of the variable. In some instances, the cache loss state indicates removal of the value from the variable, resulting in a null value. The cache restore process may include rebuilding the variables in the data cache by refreshing the null value with the non-null value from, for example, a persistent data store. In some embodiments, certain variables may be identified using a computer processor that are to be cleared, and subsequently clearing the non-null variable and setting the cache loss indicator to indicate the value was cleared intentionally.

In another aspect, the invention provides a system for data management, including one or more computer processors programmed to perform operations comprising: retrieving, from a data cache, variables that include a cache loss indicator and a non-null value, analyzing the variables to determine a state of the cache loss indicator. If the cache loss indicator indicates a cache loss state, removing the cache loss indicator and providing the value to an application; and otherwise, initiating a cache loss process.

In certain embodiments, the variable may be a string data type, a data pairing, or an integer data type. The cache loss indicator may be appended to the beginning or the end of the variable. In some instances, the cache loss state indicates removal of the value from the variable, resulting in a null value. The cache restore process may include rebuilding the variables in the data cache by refreshing the null value with the non-null value from, for example, a persistent data store. In some embodiments, certain variables may be identified using a computer processor that are to be cleared, and subsequently clearing the non-null variable and setting the cache loss indicator to indicate the value was cleared intentionally.

In another aspect, the subject matter described in this specification relates to an article. The article comprises a non-transitory computer-readable medium with instructions stored thereon that, when executed by one or more computer processors, causes the computer processors to: retrieve, from a data cache, variables that include a cache loss indicator and a non-null value; analyze the variables to determine a state of the cache loss indicator; if the cache loss indicator indicates a cache loss state, remove the cache loss indicator and provide the value to an application; and otherwise, initiate a cache loss process.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
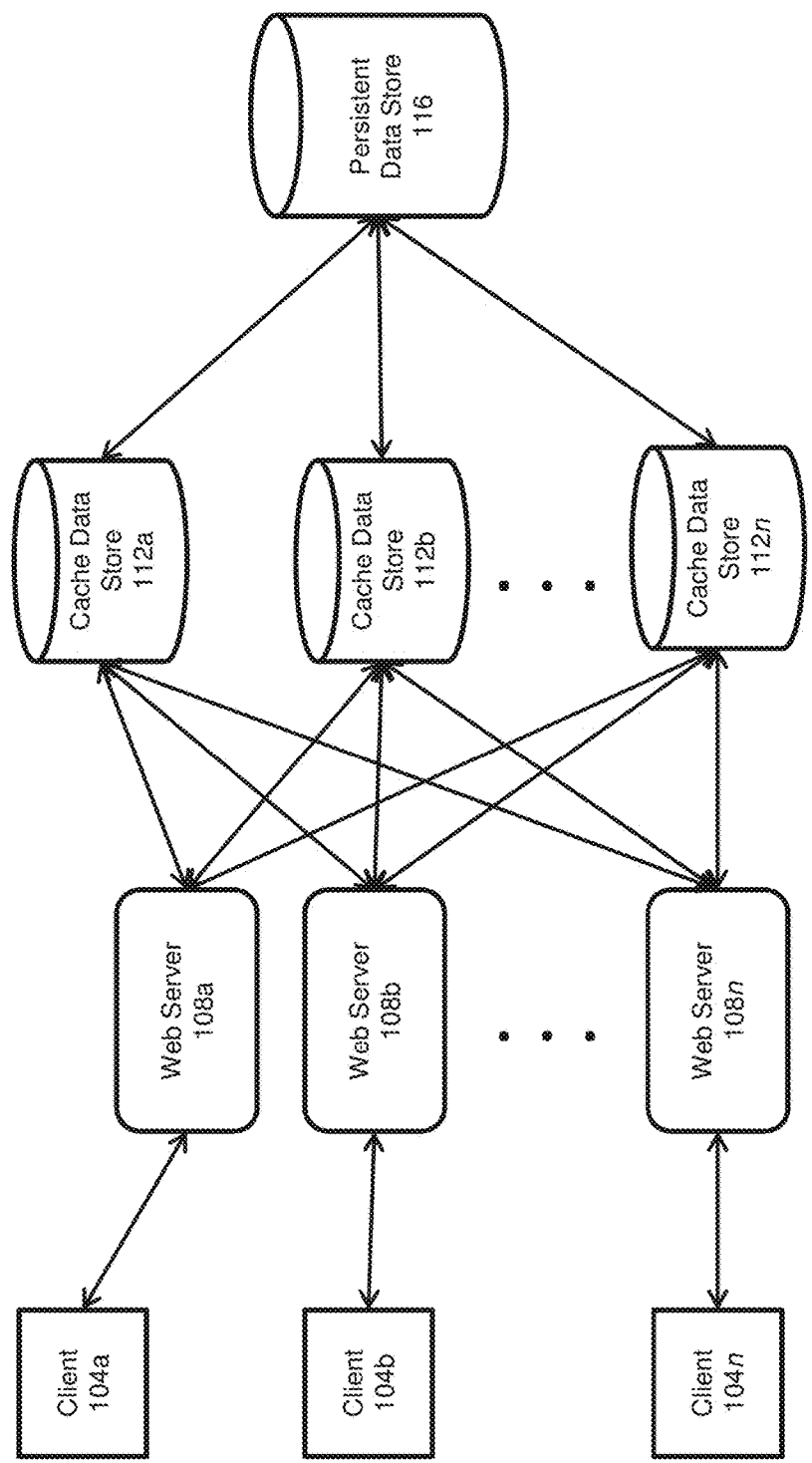
FIG. 1 illustrates an exemplary environment in which the methods and systems of the invention may operate in accordance with various embodiments of the invention.

FIG. 1 illustrates an architecture schematic for an implementation of a web-based, multi-user application using a cached data service. Multiple client devices 104 (e.g., 104a, 104b, . . . , 104n), operated by application users, connect to one or more web servers 108 (e.g., 108a, 108b, . . . , 108n). The web servers 108 can, among other tasks, process PHP requests for data, including, for example, stored key distribution. Each web server 108 directs PHP requests to one or more cache data stores 112 (e.g., 112a, 112b, . . . , 112n). The cache data stores 112 may be built and/or refreshed with data from a persistent data store 116.

Figure 2:
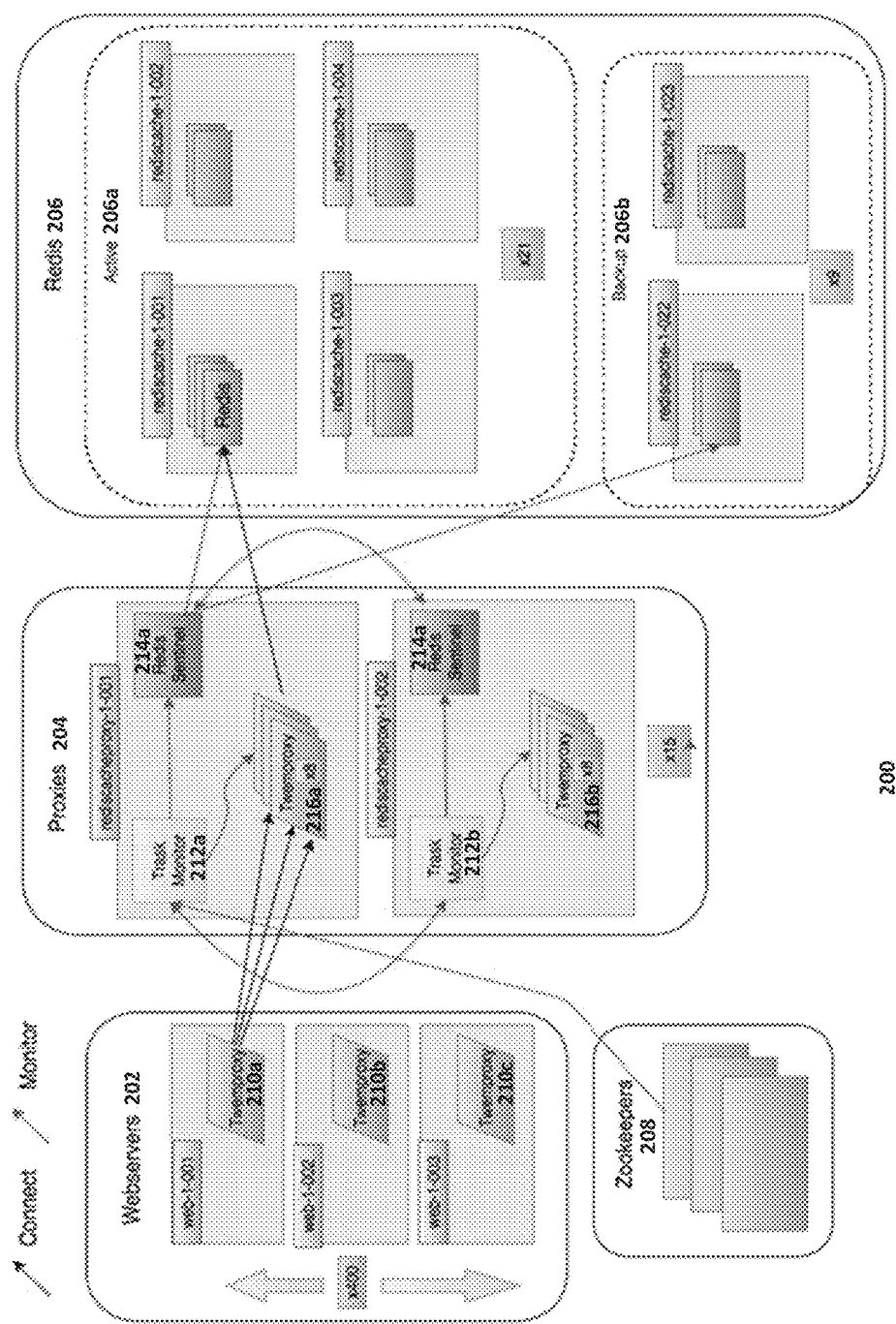
FIG. 2 illustrates an exemplary architecture in which the methods and systems of the invention may operate in accordance with various embodiments of the invention.

The architecture illustrated in FIG. 1 may be used, for example, to implement a configuration of webservers, proxy servers and database hosts in a cache data management system 200 as illustrated in FIG. 2. The cache data management system 200 includes one or more webservers 202 and proxy machines 204 that coordinate cache requests to a pool or cluster of database hosts 206. The database hosts 206 can be further divided into active hosts 206a and backup or reserve hosts 206b. In certain implementations, one or more state monitoring servers or "zookeeper" cluster 208 provide status and priority data to the cache data management system 200.

The webservers 202 service application requests, and act as the clients of cache data management system 200. PHP workers resident on the webservers 202 receive application requests, such as a request for cache keys stored on the database hosts 206. When an application request is made, the PHP worker establishes a direct connection to a local twemproxy instance 216 (e.g., twemproxy instances 216a, 216b, etc.) residing on the proxy machines 204 instead of requiring a connection to a VIP. For certain cache requests, such as "deletes," the PHP worker may repeat failed attempts until successful, or until a threshold count is reached.

To manage the routing of the requests, each webserver 202 has a local twemproxy instance 210 (e.g., twemproxy instances 210a, 210b, 210c, etc.) that routes traffic from the webserver 202 to a selected database instance on the database hosts 206, and provides load balancing services across the proxy machines 204. For every cache request, the twemproxy instance 210 routes the request to a twemproxy instance 216 on a proxy machine 204 selected from its configured server pool. The selection of a particular proxy machine 204 may be random within a dedicated server pool. If any proxy machine 204 becomes unavailable, the twemproxy instance 210 may blackout that machine for a period of time until it is restarted or replaced.

In certain instances, the proxy machines 204 route traffic from the webservers 202 to the database hosts 206, performing key distribution in the process. Each proxy machine 204 hosts a trask (Twemproxy Redis Agent for Sentinel identified failbacK) monitor 212 and sentinel instance 214, which monitors the health of the database hosts 206. The trask monitor 212 manages the twemproxy instances 216, coordinates reloads, listens to the sentinel instance 214 for any changes in the status of the database hosts 206, distributes changes to twemproxy configurations, triggers reloads on the twemproxy instances 216 on the proxy machines 204, keeps track of the database hosts 206, and can perform other like functions. Because the twemproxy instances 216 distribute the keys according to its configured server pool, the twemproxy instances 216 generally maintain the same configured server pools.

The active hosts 206a serve traffic as the active server pool. Other reserve hosts 206b serve as backups. The external zookeeper cluster 208 operates as a centralized service for maintaining configuration information, naming, providing distributed synchronization, providing group services for the database hosts 206, and houses the state of the database hosts 206, as well as determining a proxy leader, among other functions.

In this embodiment of the cache data management system 200, there is no need for any master/slave relationships among database host machines, as the pool of reserve hosts 206b are available to replace a failed machine or to be used if the cluster size increases. Furthermore, the cache data management system 200 eliminates the need for heartbeat cables, allows for multiple, automatic failovers, reduces single pair failures, and improves overall tolerance for network instability.

In embodiments in which the database hosts 206 operate as a cache layer on top of or in conjunction with another permanent data store (e.g., My SQL or the like), any application requests that cannot be serviced using the cache layer can fall back to the permanent data store, thus allowing newly activated database hosts 206 from the pool of reserve hosts 206b to be instantiated as "empty" (or in some cases substantially empty) and populated post-activation using data from the permanent data store. In other words, the reserve hosts 206b do not need to maintain or otherwise store historical or reserve cache data.

To initiate the cache data management system 200, each database host 206 initiates one or more database instances. The zookeeper cluster 208 is started, and configurations for the trask monitors 212 and twemproxy instances (210 and 216) are provided to the webservers 202 and proxy machines 204. An initial sentinel configuration is sent to each proxy machine 204, and the sentinel instances 214 are initiated on each proxy machine 204. The trask monitors 212 are then started on each proxy machine 204. Each trask monitor 212 is in communication with the zookeeper cluster 208 and assigned to a cache database pool on the database hosts 206. Each twemproxy instance (210 and 216) is then started, and the twemproxy instances 210 on each webserver 202 are pointed to their corresponding twemproxy instance 216 on the proxy machines 204.

The sentinel instances 214 monitor the health of the database instances operating on the database hosts 206, reporting when an instance or a machine becomes unavailable. Each proxy machine 204 can host one sentinel instance 214 (although more than one sentinel instance 214 is possible), which is initiated prior to initiating the trask monitor 212. The sentinel instances 214 discover each other when they are monitoring the same cache database instance and communicate with each other to form a consensus regarding the status of the instance, e.g., whether it is operational or down. By having multiple sentinel instances 214 listening to the same database instance, the greater the sensitivity the sentinel instances 214 have to detecting that a database host 206 has failed. For example, a configuration file may be provided to the sentinel instance 214 that affects its monitoring activities. The sentinel instance 214 can also update its own configuration file when its state changes. However, in some instances any changes to the sentinel instance 214 monitoring tasks are provided by the trask monitor 212, which can synchronize the sentinel monitoring across its current cache pool.

In some instances, the data used to fulfill the message requests is stored in a combination of persistent and cached data stores as described above with reference to FIG. 1. Cached data stores store a subset of the overall application data that is used frequently and often in multiple places. By storing the data in "memory" as opposed to disk and making this data available on multiple "nodes," users can experience a significant increase in application performance.

However, when multiple copies of data exist, detecting and managing data deletions or failures becomes a critical component of operating such an environment. For example, replication and distribution of data across a cluster of Redis databases can increase the availability of, and speed of access to, information stored in the database by making multiple copies of the same information available for read requests, and allowing read and write operations to be performed by different servers. But if a database fails, or data is somehow lost, overwritten, or deleted, there needs to be a way to track specific variables—that is to determine whether, for example, a variable has been lost unintentionally due to server failure or if the variable was removed or cleared manually.

Figure 3:
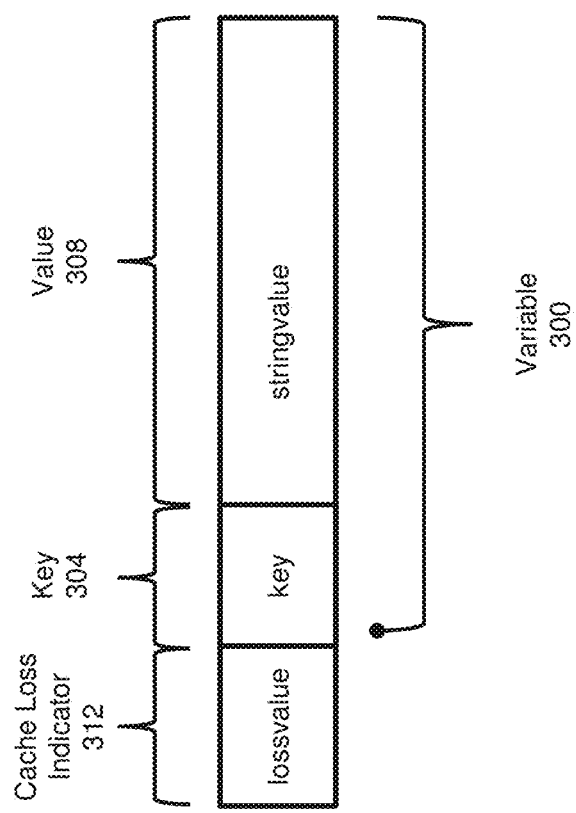
FIG. 3 is an illustrative data format according to one embodiment of the invention.

Referring to FIG. 3, one technique for addressing this potential data loss and subsequent tracking of its cause comprises adding a consistent "dummy variable" to act as a cache loss indicator to the variable. For example, if a variable 300 includes a key 304 and a value 308, a cache loss indicator 312 can be appended or prepended to the pairing and assigned a loss value (lossvalue) to indicate whether the variable has been deleted intentionally. Any suitable dummy variable can be used as the cache loss indicator 312 to create a set, a string or other data paring comprised of the cache loss indicator 312 and the variable 300 stored in the cache database.

For purposes of illustration and not limitation, the cache loss indicator 312 can be set to "CacheDummy" (e.g., a string, although any other suitable dummy marker value or indicator can be used). Every variable 300 going forward would be a concatenation of the cache loss indicator 312 and the actual variable 300. For example, setting (through an appropriate wrapper function) a cache key X to the value of "2" will actually set it to "CacheDummy2." Additionally, retrieving (through a suitable wrapper function) the cache key X containing "CacheDummy2" will actually return the value "2." Unsetting (through a suitable wrapper function) the cache key X will actually reset it to "CacheDummy" to mark it as empty. During normal application runtime, if any cache value does not return "CacheDummy" in their value, then a suitable wrapper function can automatically ask the database (e.g., the cache data management system 200) to rebuild the cache.

Using this approach, when the variable value 308 is cleared intentionally, the cache loss indicator 312 can be set to indicate that the value was in fact cleared intentionally. As a result, if the value 308 is returned empty and the cache loss indicator 312 is not set to indicate an intentional clearing, a presumption can be made that the loss was unintentional, and the value can be restored.

Figure 4:
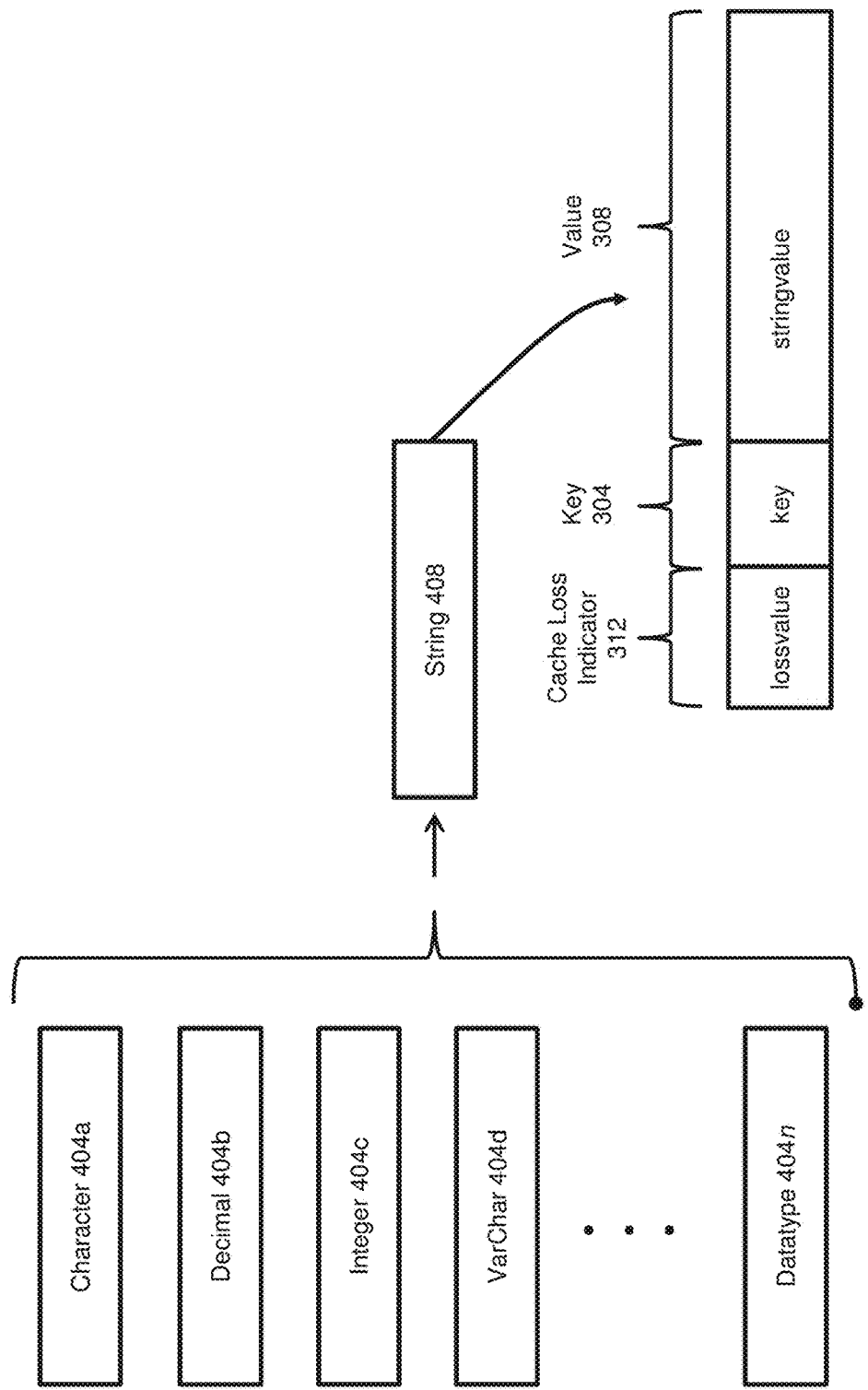
FIG. 4. illustrates certain data translation steps associated with various embodiments of the invention.

FIG. 4 illustrates various embodiments in which the variable 300 being marked can be applied to any type of variable 404, including character (404a), decimal (404b), integer (404c), varchar (404d), and, in fact, any data type (e.g., data type 404n), which can be converted to, for example, a string 408 (or other appropriate data type) and appended as described above. The cache loss indicator 312 can be appended to the beginning of the string or the end, so long as the location is consistent.

Figure 5:
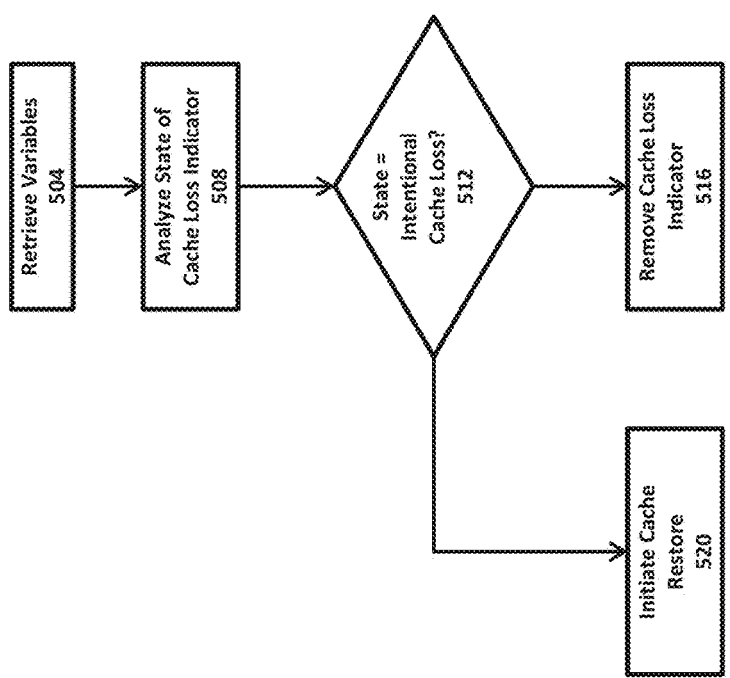
FIG. 5 is a flow chart exemplifying a method according to one embodiment of the invention.

FIG. 5 illustrates one exemplary technique for setting the cache loss indicator 312. Initially, one or more variables are requested and retrieved from a cache store (such as the cache data store 112 of FIG. 1) (STEP 504). The state of the cache loss indicator 312 is then analyzed (STEP 508) and a determination is made as to whether it has been set to indicate that the value 308 has been intentionally cleared (DECISION STEP 512). If the cache loss indicator 312 indicates an intentional cache loss state, the cache loss indicator 312 is removed (STEP 516) (e.g., setting it to "null") and the value 308 is provided to an application. Otherwise, a suitable cache restore process can be initiated (STEP 520). The cache restore process may include, for example, retrieving the variables from a persistent data store and replacing the cached data with updated and/or refreshed data.

Figure 6:
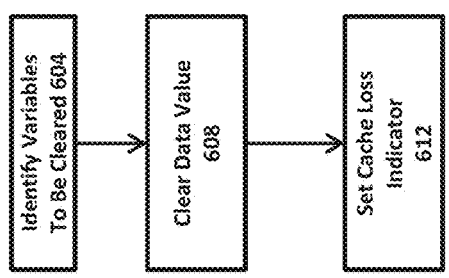
FIG. 6 is a flow chart exemplifying a method according to one embodiment of the invention.

FIG. 6 illustrates another embodiment in which the cache loss indicator 312 may be set when appropriate. Initially, a set of variables 300 is identified as "to be cleared" (STEP 604). The values 308 for those variables 300 are then cleared (STEP 608) and the cache loss indicator 312 is set accordingly (STEP 612). Subsequent retrievals of the variable(s) 300 will then indicate that the variables 300 were intentionally cleared, and that a cache restore is not necessary.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including, by way of example, semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for data management, comprising:
   retrieving, from a data cache, one or more variables, wherein each variable comprises a cache loss indicator and a value;
   analyzing, by one or more computer processors, at least one of the one or more variables to determine a presence of the cache loss indicator; and
   determining the presence of the cache loss indicator and when the cache loss indicator is present in the analyzed variable, removing, by the one or more computer processors, the cache loss indicator from the analyzed variable and providing the value to an application, and when the cache loss indicator is not present, initiating, by the one or more computer processors, a cache restore process for the analyzed variable.

2. The method of claim 1, wherein the variable comprises a string data type.

3. The method of claim 1, wherein the value comprises an integer data type.

4. The method of claim 1, wherein the cache loss indicator is appended to a beginning of each variable.

5. The method of claim 1, wherein the cache loss indicator is appended to an end of each variable.

6. The method of claim 1, wherein the variable comprises a data paring.

7. The method of claim 1, wherein the variables are restored from a persistent data store.

8. The method of claim 1, comprising:
   identifying one or more variables stored in the data cache to be cleared; and
   clearing the value and setting the cache loss indicator to indicate the value was cleared intentionally.

9. The method of claim 1, wherein an absence of the cache loss indicator indicates an unintentional removal of the value from the variable, resulting in a null value.

10. The method of claim 9, wherein the cache restore process comprises rebuilding the variable in the data cache by refreshing the null value with the value.

11. A system for data management, comprising:
    one or more computer processors programmed to perform operations to:
    retrieve, from a data cache, one or more variables, wherein each variable comprises a cache loss indicator and a value;
    analyze at least one of the one or more variables to determine a presence of the cache loss indicator; and
    determining the presence of the cache loss indicator and when the cache loss indicator is present in the analyzed variable, remove the cache loss indicator from the analyzed variable and provide the value to an application and when the cache loss indicator is not present, initiate a cache restore process for the analyzed variable.

12. The system of claim 11, wherein the variable comprises a string data type.

13. The system of claim 11, wherein the cache loss indicator is appended to a beginning of each variable.

14. The system of claim 11, wherein the cache loss indicator is appended to an end of each variable.

15. The system of claim 11, wherein the variable comprises a data paring.

16. The system of claim 11, wherein the variables are restored from a persistent data store.

17. The system of claim 11, wherein the operations are further performed to:
    identify one or more variables stored in the data cache to be cleared; and
    clear the value and setting the cache loss indicator to indicate the value was cleared intentionally.

18. The system of claim 11, wherein an absence of the cache loss indicator indicates an unintentional removal of the value from the variable, resulting in a null value.

19. The system of claim 18, wherein for the cache restore process, the one or more computer processors are further programmed to:
    rebuild the variable in the data cache by refreshing the null value with the value.

20. A non-transitory computer-readable medium having instructions stored thereon that, when executed by one or more computer processors, cause the one or more computer processors to:
    retrieve, from a data cache, one or more variables, wherein each variable comprises a cache loss indicator and a value;
    analyze at least one of the one or more variables to determine a presence of the cache loss indicator; and
    determine the presence of the cache loss indicator and when the cache loss indicator is present in the analyzed variable, remove the cache loss indicator from the analyzed variable and provide the value to an application, and when the cache loss indicator is not present, initiate a cache restore process for the analyzed variable.

* * * * *